United States Patent Office 3,205,187
Patented Sept. 7, 1965

3,205,187
MAKING CATIONICALLY STABILIZED LATEXES FROM ANIONICALLY STABILIZED LATEXES
John W. Vanderhoff, Midland, Mich., assignor to The Dow Chemical Company, Midland, Mich., a corporation of Delaware
No Drawing. Filed Sept. 22, 1960, Ser. No. 57,633
4 Claims. (Cl. 260—29.7)

This application is a continuation-in-part of my co-pending application, Serial No. 594,345, filed June 28, 1956, now abandoned.

This invention relates to making cationically stabilized latexes from anionically stabilized latexes. More particularly it pertains to method and means for making cationically stabilized aqueous dispersions from starting aqueous colloidal dispersions of solid addition polymers wherein the dispersed particles are stabilized by anionic means.

Preparation and uses of aqueous colloidal dispersions, often called latexes, of solid addition polymers are well known and commonplace. For some uses, e.g., for deposition on paper and cotton fibers, it is sometimes desired to have aqueous colloidal dispersions wherein the particles of dispersed polymer carry a positive charge, i.e., are cationic in nature. However, the preparation of such cationic latexes in stable form has not been easy or entirely satisfactory. The preparation of anionically stabilized latexes by emulsion polymerization of selected monomers in aqueous media with anionic emulsifiers such as fatty acid soaps, long chain alkyl sulfates or sulfonates, alkylarylsulfonates, and the like is a well developed art, and a wide variety of polymers can be made in anionically stabilized latex form. On the other hand, the preparation of cationically stabilized latexes by emulsion polymerization with cationic emulsifiers is much more limited and seems to be adapted to relatively fewer kinds of polymers, catalysts, etc.

It is a desideratum of the art to prepare cationically stabilized latexes by first preparing an anionically stabilized latex by well known means and then to convert such anionically stabilized latex to one that is cationic in nature for use where such cationically stabilized latex is necessary or desirable. The obvious procedure of adding a cationically active material to an anionically stabilized latex usually fails because the dispersed polymer phase coagulates or precipitates upon the addition of the cationic agent, and only rarely can the resulting precipitate or coagulum be effectively redispersed by further addition of cationic material.

Accordingly, it is an object of this invention to provide cationically stabilized latexes from anionically stabilized latexes.

A more specific objective is to provide method and means for making cationically stabilized aqueous dispersions from starting aqueous dispersions of solid addition polymers in which the colloidally dispersed polymer particles are stabilized by anionic means.

Other objects and advantages of the invention will be evident in the following description.

In brief and in its broadest terms, the invention provides method and means for attaining its objects by adding an anionically stabilized starting latex to an aqueous solution of a water-soluble organic cationic polyelectrolyte with rapid admixing, the starting latex and the cationic polyelectrolyte being used in amounts such that the cationic polyelectrolyte is in excess relative to the effective anionic stabilizer in the starting latex on an equivalent weight basis.

It is essential that the above order of addition and admixing be observed to attain the stated result. The starting anionic latex must be added to and rapidly admixed with the cationic polyelectrolyte solution. The addition of the cationic material to the anionic latex causes coagulation of the dispersed polymer, and the coagulation is usually irreversible.

It is also essential that the amount of cationic polyelectrolyte be in excess of the effective anionic stabilizer present in the starting latex on an equivalent weight basis as will be more fully set forth below.

The kind of starting anionically stabilized latex that is used is not critical. It is stated unequivocally that any and all anionically stabilized aqueous dispersions of solid addition polymers in which the colloidally dispersed polymer particles are stabilized by anionic means are operable and can be and are used as starting materials to make cationically stabilized aqueous dispersions in accordance with this invention with substantially the same results.

It is intended that the terms "anionically stabilized latexes" and "anionically stabilized aqueous dispersions of solid addition polymer" encompass broadly the products of emulsion polymerization of polymerizable unsaturated monomers of all kinds by any means wherein the resulting polymer particles acquire a negative charge, demonstrable electrophoretically as being attracted to the anode of an electrolytic cell, whether such charge be generated by action of a polymerizable anionic monomer constituent, an absorbed anionic emulsifier, a reactive catalyst, or otherwise. As stated hereinbefore, kinds of polymerizable unsaturated monomers, aqueous polymerization media, catalysts, emulsifiers, procedures and means for making anionically stabilized latexes are well known in the art and reference is made thereto for the purposes of the present invention. Merely for purposes of illustration and not for limitation, reference is made to the art-accepted treatise, "Polymer Processes," edited by Calvin E. Schildknecht, published (1956) by Interscience Publishers, Incorporated, New York, Chapter IV, "Polymerizations in Emulsion," by H. Leverne Williams. There is set forth in Table II of that publication diverse kinds of monomers which can be polymerized alone (homopolymers) or in mixtures (copolymers). Diverse anionic emulsifiers, catalysts and catalyst activators, chain transfer agents, and procedural steps are also set forth in the cited book and other published art. Reference is also made to "Emulsion Polymerization," by F. A. Bovey et al., published (1955) by Interscience Publishers, Incorporated, New York.

The kind of water-soluble organic cationic polyelectrolytes for use in this invention is also not critical. It is stated unequivocally that any and all water-soluble organic cationic polyelectrolytes are operable and can be and are used as starting materials to make cationically stabilized aqueous dispersions in accordance with this invention with substantially the same results.

It is intended that the term "organic cationic polyelectrolytes" encompass broadly the water-soluble materials of high molecular weight having a plurality of cationic groups as parts of a polymeric molecular structure. Particularly effective for the present purposes are cationic polyelectrolytes having a relatively large number of strongly ionized cationic groups as substituents on polymer molecules having molecular weights in the order of several thousand or more. The cation function can be supplied by any of the known cationic groups such as the various amine, quaternary ammonium, and analogous basic nitrogenous groups. Water-soluble organic cationic polyelectrolytes are also well known to the art. Merely for purpose of illustration and not for limitation, examples of water-soluble organic cationic polyelectrolytes that can be and are used as starting materials to make cationically stabilized aqueous dispersion in accordance with this invention are the following: those that contain primary, secondary, or tertiary amine groups or quaternary ammonium groups attached to or part of polymeric chains such as water-soluble polymers of ar-vinylbenzylamine, N-alkyl-ar-vinylbenzylamine (e.g., N-methyl-ar-vinylbenzylamine), N-(hydroxyalkyl)-ar-vinylbenzylamine (e.g. N-(2-hydroxyethyl)-ar-vinylbenzylamine), N,N - dialkyl-ar - vinylbenzylamine (e.g. N,N - dimethyl-ar-vinylbenzylamine), N,N-di-(hydroxyalkyl) - ar-vinylbenzylamine, N,N,N-trialkyl-ar-vinylbenzylammonium hydroxide or salt, N,N - dialkyl-N-(hydroxyalkyl) - ar-vinylbenzylammonium hydroxide or salt, vinylamine, N,N,N-trialkylvinylammonium hydroxide or salt, 2-vinylpyradine, 2-(dialkylamino)ethyl acrylate (e.g. 2-dimethylaminoethyl acrylate), 2-(dialkylamino)ethyl methacrylate (e.g., 2-dimethylaminoethyl methacrylate), polyethyleneimine, and the like. It is known in the art that weakly basic primary, secondary and tertiary amino polyelectrolytes are strongly ionic only in their salt form, i.e., at pH values in the range from neutral to acid at or below the equivalence value. The strongly basic quaternary ammonium polyelectrolytes are highly ionic in all ranges of pH. Typical water-soluble ionic salts of these cationic polyelectrolytes are the halides, e.g., chlorides and bromides, sulfates, phosphates and nitrates and salts with organic acids such as acetic acid.

The invention is practiced by adding the starting anionically stabilized aqueous polymer latex to a water solution of the water-soluble organic cationic polyelectrolyte with rapid admixing. The concentration of the polymer in the latex starting material and the concentration of the cationic polyelectrolyte in the solution thereof can be varied. It is observed that effective admixing is relatively easier with relatively dilute starting latexes and/or cationic polyelectrolyte solutions, and the resulting dilute, stable, cationic latex compositions are highly desired for some end uses. Admixing more concentrated compositions of latex and/or cationic polyelectrolyte presents more difficulties of rapid and thorough admixing. The mechanics of admixing can, of course, take advantage of usual mixing apparatus such as stirrers, pumps, and the like. The temperature of admixing is not critical and is conveniently at or near room-temperature.

The amounts of starting anionically stabilized latex and of cationic polyelectrolyte solution that are admixed are such that the latter is in excess on an equivalent weight basis. The equivalent weight of the cationic polyelectrolyte will be known from its structure as the average weight corresponding to one cationic group. Similarly, the equivalent weight of the anionically stabilized polymer latex corresponding to one effective anionic group will be known from the identities of the constituents therein. It will be observed that only the effective equivalent weight of the anionic polymer is required; in instances for example where the starting latex contains an added anionic emulsifier part of which is not absorbed on the polymer particles, is buried in the polymer, or is otherwise ineffective so that only a part of such anionic material is effective in providing anionic groups on the polymer particles, only such effective part need be considered in calculating the equivalent weight of the anionic polymer. In instances where the identity of the constituents of the anionic polymer starting latex may not be known, the equivalent anionic weight can be experimentally determined in known manner. Usually, it will be observed that the amount of excess cationic polyelectrolyte that is necessary to avoid coagulation when the anionically stabilized starting latex is added thereto is relatively greater when either or both of the starting materials is relatively more concentrated. When either or both of the starting materials is relatively more dilute, the amount of excess cationic polyelectrolyte can be reduced. Usually the ratio of the cationic polyelectrolyte to the anionic polymer in the starting latex, on an equivalent weight basis, is from slightly more than 1:1 when very dilute starting materials are used and/or when the admixing is most nearly ideal to 3:1 or more than 3:1 when more concentrated starting materials are used and/or when the admixing is less perfect.

The following examples illustrate the invention in accord with the statutes but are not to be construed as limiting its scope. In the examples, parts and percentages are by weight.

EXAMPLE 1

In this example there was used an anionically stabilized colloidal aqueous dispersion, i.e., a latex, of a styrene-butadiene copolymer (approximately 60 percent styrene and approximately 40 percent 1,3-butadiene, by weight) in a slightly alkaline medium. The dispersion was stabilized during its manufacture with approximately 0.48 percent sodium lauryl sulfate and approximately 0.45 percent sodium dodecyl benzene sulfonate, based on the copolymer.

The water-soluble cationic polyelectrolyte was polymerized ar-vinylbenzyltrimethylammonium chloride whose solution at 0.5 percent concentration in 2 percent sodium chloride aqueous solution had a viscosity of 1.2 centipoises at 25° C. The cationic polyelectroylte was a technical grade having an assay value of 81 percent active material.

In a preliminary test, not exemplary of the invention, a water solution of the cationic polyelectrolyte was added to a diluted sample of the latex. The polymer content of the latex promptly coagulated and could not be redispersed by adding more of the cationic polyelectrolyte.

As an example of the invention, one part of the above described latex, containing 5 percent of the copolymer, was added with thorough and rapid admixing to two parts of an aqueous solution containing 0.1 percent of the cationic polyelectrolyte. The resulting latex was cationic and very stable.

In further tests of the procedure just described, samples of the same latex at various concentrations were added to and rapidly admixed with samples of the cationic polyelectrolyte at various concentrations. The data are summarized in Table I. In each instance, very stable cationic latexes were obtained with amounts of latex less than the amounts shown in the last column to the right which represent the limiting amount in each test. It will be understood that stable cationic latex compositions are obtained at all values of added latex less than the limiting value shown for each test.

*Table I*

| Test | Cationic Polyelectrolyte Solution | | Polymer Latex | |
|---|---|---|---|---|
| | Conc., Percent | Parts | Conc., Percent | Limiting Parts |
| 1 | 0.1 | 10 | 5 | 9.7 |
| 2 | 0.5 | 10 | 5 | 5.0 |
| 3 | 0.02 | 20 | 5 | 4.4 |
| 4 | 0.05 | 10 | 2 | 13.2 |
| 5 | 0.02 | 10 | 2 | 5.6 |
| 6 | 0.01 | 20 | 2 | 6.0 |
| 7 | 0.02 | 10 | 0.5 | 24.5 |
| 8 | 0.01 | 10 | 0.5 | 12.5 |
| 9 | 0.005 | 10 | 0.5 | 6.6 |
| 10 | 0.002 | 20 | 0.5 | 5.4 |
| 11 | 0.001 | 40 | 0.5 | 5.8 |

EXAMPLE 2

In this example there was used a latex of a copolymer of approximately 67 percent ethyl acrylate and 33 percent methyl methacrylate with a small amount of free carboxylic acid groups in ammonium salt form, anionically stabilized with 3.6 percent of a sodium alkylaryl polyether sulfonate emulsifier based on the copolymer.

In a preliminary test, the addition of a water-solution of the water-soluble cationic polyelectrolyte described in Example 1 to the latex caused coagulation of the copolymer and the coagulum could not thereafter be redispersed.

As an example of the invention, one part of the above-described latex, containing 5 percent of the copolymer, was added with thorough and rapid admixing to two parts of an aqueous solution containing 0.1 percent of the cationic polyelectrolyte described in Example 1. The resulting latex was cationic and very stable.

In further tests of the procedure just described, samples of the same latex at various concentrations were added to and rapidly admixed with samples of the cationic polyelectrolyte at various concentrations. The data are summarized in Table II. In each instance very stable cationic latexes were obtained when the amount of added latex was less than the amount shown in the last column to the right where the value shown is the limiting value in each test.

*Table II*

| Test | Cationic Polyelectrolyte Solution | | Polymer Latex | |
|---|---|---|---|---|
| | Conc., Percent | Parts | Conc., Percent | Limiting Parts |
| 12 | 0.1 | 10 | 5 | 6.2 |
| 13 | 0.05 | 20 | 5 | 6.1 |
| 14 | 0.02 | 30 | 5 | 4.2 |
| 15 | 0.1 | 10 | 3.22 | 9.7 |
| 16 | 0.05 | 10 | 3.22 | 5.0 |
| 17 | 0.02 | 20 | 3.22 | 4.5 |
| 18 | 0.02 | 10 | 0.5 | 15.5 |
| 19 | 0.01 | 10 | 0.5 | 8.0 |
| 20 | 0.005 | 20 | 0.5 | 9.6 |

EXAMPLE 3

In this example there was used a latex of a copolymer of about 80 percent vinyl chloride and 20 percent dibutyl maleate anionically stabilized with about 1.46 percent dihexyl ester of sodium sulfosuccinic acid and about 0.28 percent sodium 2-ethylhexylsulfate, based on the copolymer.

In a preliminary test, the addition of a water solution of the water-soluble cationic polyelectroylte described in Example 1 to the latex caused irreversible coagulation of the copolymer.

As an example of the invention, three parts of the above-described latex containing 0.5 percent of the copolymer was added with thorough and rapid admixing to one part of an aqueous solution containing 0.02 percent of the cationic polyelectrolyte described in Example 1. The resulting latex was cationic and very stable.

In further tests of the procedure just described, samples of the same latex at the same concentration were added to and rapidly admixed with samples of the cationic polyelectrolyte at various concentrations. The data are summarized in Table III. Stable cationic latexes were obtained in each instance when the amount of added latex was less than the amount shown in the last column to the right where the value shown is the limiting value in each test.

*Table III*

| Test | Cationic Polyelectrolyte Solution | | Polymer Latex | |
|---|---|---|---|---|
| | Conc., Percent | Parts | Conc., Percent | Limiting Parts |
| 21 | 0.02 | 5 | 0.5 | 17.0 |
| 22 | 0.01 | 5 | 0.5 | 8.2 |
| 23 | 0.01 | 10 | 0.5 | 16.3 |
| 24 | 0.005 | 10 | 0.5 | 8.7 |

EXAMPLE 4

In this example there was used a latex of polystyrene anionically stabilized with about 0.76 percent dihexyl ester of sodium sulfosuccinic acid and about 0.93 percent sodium capryl polyphosphate.

In a preliminary test, the polystyrene was irreversibly coagulated when a water solution of the cationic polyelectrolyte described in Example 1 was added to the latex.

As an example of the invention, one part of the above described polystyrene latex containing 5 percent of polystyrene was added with thorough and rapid admixing to two parts of an aqueous solution containing 0.1 percent of the cationic polyelectrolyte described in Example 1. The resulting latex was cationic and very stable.

In further tests of the procedure just described, samples of the same latex at various concentrations were added to and rapidly admixed with samples of the cationic polyelectroylte at various concentrations. The data are summarized in Table IV. Stable cationic polystyrene latexes were obtained in each instance when the amount of added latex was less than the amount shown in the last column to the right where the value shown is the limiting value in each test.

*Table IV*

| Test | Cationic Polyelectrolyte Solution | | Polymer Latex | |
|---|---|---|---|---|
| | Conc., Percent | Parts | Conc., Percent | Limiting Parts |
| 25 | 0.1 | 10 | 5.0 | 8.8 |
| 26 | 0.05 | 20 | 5.0 | 9.5 |
| 27 | 0.01 | 20 | 5.0 | 2.2 |
| 28 | 0.02 | 20 | 2.0 | 11.2 |
| 29 | 0.01 | 20 | 2.0 | 6.1 |
| 30 | 0.005 | 20 | 2.0 | 3.7 |
| 31 | 0.02 | 10 | 0.5 | 22.9 |
| 32 | 0.01 | 10 | 0.5 | 12.5 |
| 33 | 0.005 | 10 | 0.5 | 7.3 |
| 34 | 0.002 | 10 | 0.5 | 6.1 |
| 35 | 0.001 | 40 | 0.5 | 6.7 |

In each of the foregoing examples, calculations and tests show that in the stable cationic latex products the amount of the cationic polyelectroylte is in excess of the effective anionic stabilizer in the starting latex on an equivalent basis.

EXAMPLE 5

In Examples 1–4, the same cationic polyelectrolyte was used throughout in order to facilitate comparison of the diverse polymer latexes and concentrations. In place of the polymerized ar-vinylbenzyltrimethylammonium chloride cationic polyelectrolyte used in Examples 1–4 there are used the water-soluble organic cationic polyelectrolytes of the kinds hereinbefore set forth. The aqueous polymer latex is added to the water solution of the organic cationic polyelectrolyte with rapid admixing, the starting latex and the cationic polyelectrolyte being admixed in amounts such that the cationic polyelectrolyte is in excess relative to the effective anionic stabilizer in the starting latex or an equivalent weight basis. The resulting latex compositions are cationic and very stable.

EXAMPLE 6

In place of the particular latex starting materials mentioned in Examples 1–4, there are used anionically stabilized aqueous dispersions of solid addition polymers in which the colloidally dispersed polymer particles are stabilized by anionic means. The anionic starting latexes are added to and rapidly admixed with the water solution of cationic polyelectrolyte in the manner and in amounts described in Example 5 with substantially the same results.

The resulting cationically stabilized latexes are used in ways known per se, e.g., for coating and impregnating paper, cotton fibers and textiles, and the like.

What is claimed is:
1. A method for making cationically stabilized latexes from anionically stabilized latexes by adding a starting anionically stabilized starting latex which is a product of emulsion polymerization of polymerizable unsaturated monomers to an aqueous solution of a water-soluble polymeric organic cationic polyelectrolyte with rapid admixing, the starting latex and the water-soluble polymeric organic cationic polyelectrolyte being admixed in amounts such that the water-soluble polymeric organic cationic polyelectrolyte is in excess of the effective anionic stabilizer in the starting latex on an equivalent weight basis.

2. The method according to claim 1 wherein the water-soluble polymeric organic cationic polyelectrolyte is a water-soluble polymerized ar-vinylbenzyltrimethylammonium salt.

3. The method according to claim 1 wherein the starting latex is an anionically stabilized latex of a styrene-1,3-butadiene copolymer.

4. The method according to claim 1 wherein the starting latex is an anionically stabilized latex of a styrene-1,3-butadiene copolymer and the water-soluble polymeric organic cationic polyelectrolyte is a water-soluble polymerized ar-vinylbenzyltrimethylammonium salt.

References Cited by the Examiner
UNITED STATES PATENTS

| 2,595,225 | 5/52 | Coffman | 260—88.3 |
| 2,614,093 | 10/52 | Wheelock | 260—888 |
| 2,616,861 | 11/52 | Jones et al. | 260—29.4 |

OTHER REFERENCES

Schildknecht, "Polymer Processes," February 28, 1956, Chapter IV, Table II.

MURRAY TILLMAN, *Primary Examiner.*

DONALD ARNOLD, LEON J. BERCOVITZ, WILLIAM H. SHORT, *Examiners.*